United States Patent [19]
Lin et al.

[11] Patent Number: 4,807,118
[45] Date of Patent: Feb. 21, 1989

[54] METHOD FOR HANDLING SLOT REQUESTS OVER A NETWORK

[75] Inventors: Chyuan-Shiun Lin; Joel Tesler; Ching-Fa Hwang, all of Cupertino, Calif.

[73] Assignee: Hewlett-Packard Company, Palo Alto, Calif.

[21] Appl. No.: 3,154

[22] Filed: Jan. 14, 1987

[51] Int. Cl.$^4$ ............................................. G06F 15/16
[52] U.S. Cl. ...................................................... 364/200
[58] Field of Search ... 364/200 MS File, 900 MS File; 340/825.5

[56] References Cited

U.S. PATENT DOCUMENTS

| | | | |
|---|---|---|---|
| 4,543,630 | 9/1985 | Neches | 364/200 |
| 4,570,220 | 2/1986 | Tetrick et al. | 364/200 |
| 4,608,700 | 8/1986 | Kirtley, Jr. et al. | 364/900 |
| 4,639,921 | 1/1987 | Gang et al. | 364/900 |
| 4,661,902 | 4/1987 | Hochsprung et al. | 364/200 |

OTHER PUBLICATIONS

Spector, "Performing Remote Operations Efficiently on a Local Computer Network," Communications of the ACM, vol. 25, No. 4, p. 246, Apr., 1982.

Cheriton and Swaenepoel, "The Distributed V Kernel and its Performance for Diskless Workstations", PROC 9th Symp. on O.S., pp. 128-140, 1983, copy is draft version.

Primary Examiner—Gary V. Harkcom
Assistant Examiner—C. H. Lynt
Attorney, Agent, or Firm—Alan H. Haggard

[57] ABSTRACT

A method for transferring idempotent and non-idempotent requests (repeatable and non-repeatable requests respectively) over a network between two or more computer systems. The method includes sending a series of messages over a network to perform the request. The method defines several types of messages: a request message, a response message, a slow request message, and an acknowledge message. A slow request is handled by sending a slow request message in response to a retransmitted request message. When the computer system which received the request message has completed the request, a response message is sent to the requesting computer system. The requesting computer system then transmits an acknowledge message to acknowledge receipt of the response if the requesting computer system has received a slow request message even if the request was idempotent. The method reduces the amount of request message traffic on a network of the type where messages are subject to loss.

2 Claims, 7 Drawing Sheets

METHOD FOR HANDLING SLOT REQUESTS OVER A NETWORK

BACKGROUND

1. Field of Invention

This invention realtes to the field of computer networking, and more particularly to a method for handling requests for information over a very high speed network where, due to the nature of the request, the time required to handle the request is longer than the timeout set up to handle lost messages on the network. The invention is especially adapted for a network of the collision detection variety, for example, ETHERNET.

2. Description of the Prior Art

The fast reliable communication of information between computer systems has become an essential part of the modern office and factory. Various groups of manufacturers and users of computer equipment have joined together to define a networking interface standard and a few network protocols. The networking interface standard divides the functions to be performed into seven levels from Level 1, which is the physical interface, through Level 7. The network protocols define a hardware and software interface which enables computer and non-computer equipment made by different manufacturers to communicate quickly and with a minimum of custom programming. One such network protocol is known as ETHERNET.

ETHERNET is a Level 2, multiple access network protocol which uses a collision detection scheme to permit multiple computer systems or other equipment connected to the network to communicate asynchronously. In order to transmit information over the network, the network protocol requires that the information be divided into one or more messages. Then, basically, a computer system tests the network prior to sending a message to determine whether another computer system is sending a message over the network. If the network is not busy, the computer system sends the message to a destination computer system. If the network is busy, the computer system waits a prescribed period of time and tests the network again. One problem occurs when another computer system tests the network simultaneously with the first computer system and also discovers that the network is not busy. The second computer system will also send its message. There will be a collision between these messages on the network and neither destination computer system will receive its message.

In order to make the network more reliable, the network protocol requires both the first and second computer systems to monitor the network after sending their message and, if a collision is detected, retransmit their messages after a prescribed delay. This delay begins at approximately 1 millisecond and increases exponentially with each subsequent collision. However under certain circumstance, the collision will not be detected and, hence, the messages may still not reach their destination computers.

Although statistically this protocol provides a fast easy-to-use-and-to-configure network, the network is basically unreliable because a computer system cannot be guaranteed that a message which is sent will actually be received. Therefore, the next high interface level, usually a Level 3 or Level 4 protocol requires that when it is important that a message reach the destination computer system, the destination computer system should acknowledge the receipt of the message. Generally this requires that each sending computer system on the network receive an acknowledgement that the first message was received before it can continue to send the second message. According to this handshake, the sending computer systems will, after waiting a prescribed period of time without receiving the acknowledgement, retransmit the first message assuming that the message was lost. If the network is working properly and not too busy, the retransmitted message should make it to the destination computer system. It is important to recognize that when the Level 3 or 4 protocol sends a request, the Level 2 protocol may need to transmit the message several times before the Level 2 protocol believes the message was sent successfully.

The prescribed period of time for response over a network is often referred to as a timeout and is carefully defined at each level of network protocol. This prescribed period of time is a function of the network level, the size of the network and the speed of the network. Usually, the lower the network level, the shorter the prescribed period of time for a message to be sent or received. In some networks, the same timeout is used for both requests and responses, while others may use different times. In many networks, the timeouts are determined experimentally to reduce collisions while maximizing throughput.

One prior art high level protocol, the request/response protocol, has been developed which provides the low level request/acknowledge handshake by letting the response message transfer the results of the request as well as acknowledge the request message. Under this protocol, one computer system may obtain information from a serving computer system by requesting the information and waiting for an acknowledgement in the form of the requested information. If the sending computer system fails to receive the response from the serving computer system within a prescribed period of time it again requests the information, assuming that either the request or the response to the initial request was lost over the network. The serving computer system then repeats the request and generates and sends a new response. The prescribed period of time for this network level will be longer than the timeout of a lower level since this prescribed period of time must also take into account the time required to perform the request. Although this protocol results in a fast and efficient method for performing network requests, there are some problems.

The first problem is that some requests over the network may not be repeated without causing problems. This may be best explained by examining a typical file operation. A file operation typically consists of four requests: a file open, a file read and/or file write, and then a file close. The file read and write requests may be repeated in the event either the request or the response to the request are lost on the network. This is true because the file read and file write request have no state information saved in the serving computer system which might be corrupted by repeating the request. For example, if a file read request is made on an open file and the request is lost over the network, the requesting computer system merely retransmits the same file read request. If the response to the file read request is lost over the network, the requesting computer system again simply retransmits the same file read request. The serving computer system then re-reads the file accordingly and then sends the requested information over the network where it probabaly reaches the requesting computer system. These requests, which may be repeated without difficulty, are referred to as idempotent requests.

There are, however, a class of requests which may not be repeated. These requests typically have state information stored in the serving computer system which may be corrupted by repeating the request and are referred to as non-idempotent requests. These requests may not be repeated in the event a response is lost on the network. An example of a non-idempotent request is a file open request. The file open request determines the location and other information required by the operating system of the requesting computer system for the requested file and marks the file as being opened typically by incrementing a reference counter. Then this information is sent to the requesting computer system so the requesting computer system can perform the desired requests on the file. If a request to open a file is lost on the network, there is no problem since the serving computer system has not opened the file and the requesting computer system may simply retransmit the request for the file to be opened. However, if the file has been opened and the response is lost over the network, then the requesting computer system may not repeat the request that the file be opened because the serving computer system would again increment the reference counter causing the file to appear to have been opened twice. Similarly, the close request in non-idempotent. Therefore, the prior art request/response protocol must be modified to avoid this problem.

This problem is typically resolved by adding an additional response to the request/response protocol referred to as the acknowledge message or "ack". Under the revised protocol the requesting computer system sends the serving computer system an ack after the requesting computer system has received the response to its request. As with the idempotent request, the requesting computer system begins by sending a request to the serving computer system. The serving computer system performs the request and sends a response to the requesting computer system. However, the serving computer system saves a copy of the response until the receipt of the response by the requesting computer system is acknowledged. The requesting computer system then receives the response and sends an ack to the serving computer system. After the ack has been received, the serving computer system discards the copy of the response.

In the event the requesting computer system fails to receive a response, as with an idempotent request, it retransmits the request. If the request was lost before reaching the serving computer system, the serving computer system receives the request for the first time and performs the request and sends a response. If the response from the serving computer system was lost, the serving computer system, after identifying the request as a repeat request, retransmits the response to the original request rather than repeating service of the request. If the ack from the requesting computer system is not received after a prescribed period of time after sending the response, the serving computer system, assuming the response was lost, retransmits the response. The requesting computer system, after identifying the reresponse, sends another ack to the serving computer system. In this manner, non-idempotent requests may be performed reliably over the network.

Another problem with the prior art occurs when the request takes a longer period of time to be completed than the prescribed period of time for the requesting computer system to retransmit a request. In this case, the requesting computer system will retransmit and retransmit the original request until it incorrectly assumes that the serving computer system is dead or not on the network. One prior art solution to this problem is the "breath of life" message. This message is transmitted by the serving computer system in response to a repeated request while the serving computer system is still working on the previous request. When the requesting computer system receives the message, it knows that the serving computer system is operating on the network and working on the request. The requesting computer system will again wait the prescribed period of time for a response and if one is not received, retransmit the request and wait for either a response or the breath of life message.

The breath of life mechanism has two limitations. First, a network using the breath of life message will only recognize the serving computer system as being dead if there is an outstanding request. Second, it keeps retransmitting the request while the server is still processing the request, generating unnecessary network traffic. This is a serious problem for a network of the multiple access collision detection type where increasing traffic results in increasing collisions and hence more traffic until the network becomes jammed.

What is needed is a method for transferring idempotent and nonidempotent requests over a network which handles slow requests in an efficient and reliable manner.

SUMMARY

In accordance with the preferred embodiment of the present invention, a method is described for transferring idempotent and non-idempotent requests over a network between two or more computer systems. The method comprises sending a series of messages over a network to perform a request. The method defines five types of messages: a request message, a response message, a slow request message, an acknowledge message, and a state of health message.

A cluster comprises two or more computer systems which are connected together by a collision detection, multiple access network. In order to determine which computer systems are active on the network, each computer system in the cluster periodically sends a state of health message over the network. Each computer system is responsible for monitoring the network and keeping its own list of the active computer systems in the cluster.

An idempotent request is made when a requesting computer system sends a request message marked as idempotent to a serving computer system in the cluster. When the serving computer system has completed the request, the serving computer system sends a response message to the requesting computer system containing the results of the request. In the event the serving computer system fails to complete a request before the network protocol dictates that the requesting computer system retransmit the request message, the serving computer system sends a slow request message. When the requesting computer system receives the slow request message it stops sending request messages for this request. Then, after the serving computer system completes the request, the serving computer system sends a response message. The requesting computer system then acknowledges the receipt of the response message by sending an acknowledge message.

A non-idempotent request is made when a requesting computer system sends a request message to a serving computer system in the cluster. When the serving computer system has processed the request, the serving computer system sends a response message to the requesting computer system containing the results of the request. The receiving computer system keeps a copy of this response message. The requesting computer system then acknowledges the receipt of the response message by sending a acknowledge message to the receiving computer system. The receiving computer system then discards the saved response message. In the event the serving computer system fails to complete the processing of a request before the network protocol dictates that the requesting computer system retransmit the request message, the serving computer system sends a slow request message. When the requesting computer system receives the slow request message it stops sending request messages for this request. Then, after the serving computer system completes the necessary processing, the serving computer system sends a response message. The requesting computer system then acknowledges the receipt of the response message by sending an acknowledge message.

The primary objective of the present invention, therefore, is to provide a method for transferring idempotent and non-idempotent requests over a network between two or more computer systems which handles slow requests reliably.

Another object of the present invention is to provide a method which handles slow requests in a manner which does not load down the network with unnecessary messages.

A further object of the present invention is to provide a method which handles slow requests without adding unnecessary message to non-slow requests.

DESCRIPTION OF THE PREFERRED EMBODIMENT

Figure 1:
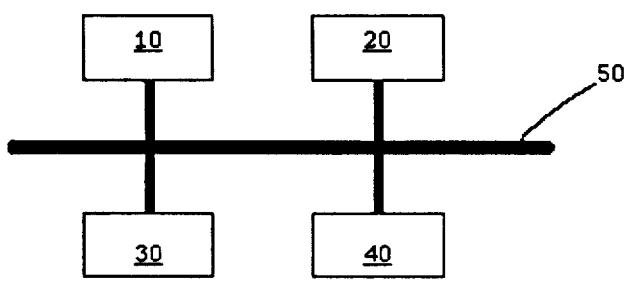
FIG. 1 is a functional block diagram of a cluster employing the method of the present invention.

FIG. 1 is a functional block diagram of a cluster employing the method of the present invention. A cluster comprises two or more computer systems, four computer system 10 through 40 are shown in FIG. 1, which are connected together by a collision detection, multiple access network 50. In order to determine which computer systems are active on the network, each computer system on the network periodically broadcasts to every other computer system in the cluster a state of health message. Each computer system is responsible for monitoring the network and keeping a list of the active computer systems on the network. In the preferred embodiment of the present invention, the state of health message is broadcast every 2 seconds. Since the state of health message is not acknowledged and may, like every other message on the network, be lost, a computer system is not considered to have failed unless a state of health message has not been received for 10 seconds. When a computer system detects that another computer system has died, it is responsible for cleaning up any uncompleted messages and notifying any programs using the network that a computer system has died.

The present invention corresponds to a Level 4 protocol and is compatible with most lower network levels, although the preferred embodiment employs the ETHERNET protocol. The prescribed time for a response to occur over the network for this network protocol is based upon the time required by the system to respond to a request. In the preferred embodiment of the present invention, the prescribed period of time begins at approximately 1.5 seconds and is doubled for each subsequent retransmission of a message up to the maximum of 15 retrys.

Figure 2:
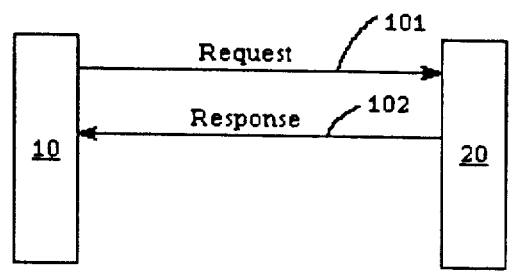
FIG. 2 is a chart of the messages for an idempotent request in accordance with the preferred embodiment of the present invention.

FIG. 2 is a chart of the messages required to make an idempotent request in accordance with the preferred embodiment of the present invention. An idempotent request is made when a requesting computer system 10 sends a request message 101 marked as idempotent to a serving computer system 20 in the cluster. When the serving computer system 20 has completed the request, the serving computer system 20 sends a response message 102 to the requesting computer system 10 containing the results of the request.

Figure 3:
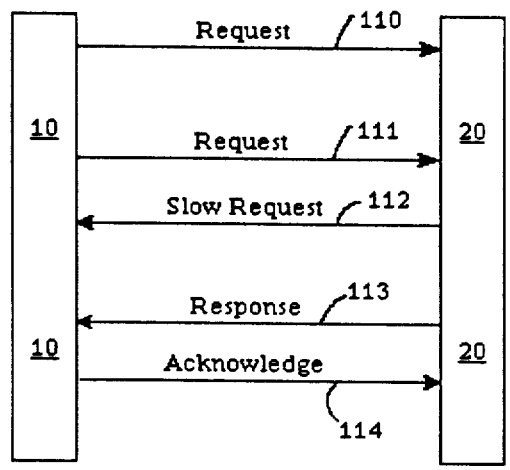
FIG. 3 is a chart of the messages for an idempotent request where the request is a slow request.

In the event the serving computer system fails to complete a request before the protocol dictates that the requesting computer system assume the request message was lost, the requesting computer system retransmits the request message and the serving computer system responds with a slow request message. The present invention employs the same slow response protocol for both idempotent and non-idempotent requests. This is an important advantage because it reduces the complexity when implementing the protocol in hardware and/or software. The protocol for idempotent and non-idempotent are discussed separately for clarity of explanation. FIG. 3 is a chart of the messages required to make an idempotent request where the request is a slow request. An idempotent request is made when a requesting computer system 10 sends a request message 110 marked as idempotent to a serving computer system 20 also on the network. When the serving computer system 20 fails to respond to the request within the prescribed period of time, the requesting computer system 10 retransmits the request as request message 111. After the serving computer system 20 identifies the request as a retransmitted request and determines that it is still working on the request, the serving computer system 20 marks the request as a slow request and sends a slow request message 112. When the requesting computer system 10 receives the slow request message 112 it stops sending request message for this request. Then, after the serving computer system 20 completes the request, the serving computer system 20 sends a response message 113. The serving computer system 20 saves a copy of the response message 113. After the requesting computer system 10 receives the response message 113 marked as a slow request, it acknowledges the receipt of the response message 113 by sending an acknowledge message 114. After the acknowledge message 114 is received, the serving computer system 20 discards its copy of the response message 113.

Figure 4:
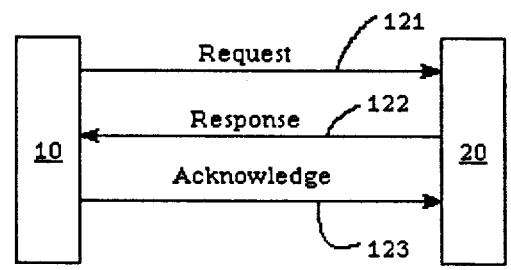
FIG. 4 is a chart of the messages for a non-idempotent request in accordance with the preferred embodiment of the present invention.

FIG. 4 is a chart of the messages required for a non-idempotent request in accordance with the preferred embodiment of the present invention. A non-idempotent request is made when a requesting computer system 10 sends a request message 121 to a serving computer system 20 in the cluster. When the serving computer system 20 has processed the request, the serving computer system sends a response message 122 to the requesting computer system 10 containing the results of the request. The serving computer system 20 keeps a copy of the response message 122 in the event the response message is lost and a repeated request by the requesting computer system 10 is made. The requesting computer system 10 then acknowledges receipt of the response message 122 by sending a acknowledge message 123. After the acknowledge message 123 is received, the serving computer system 20 discards its copy of the response message 122.

Figure 5:
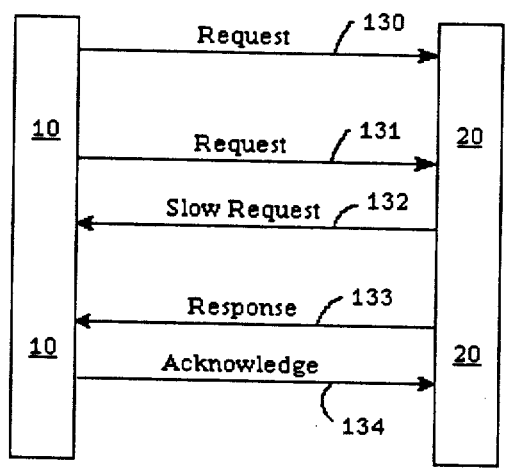
FIG. 5 is a chart of the messages for a non-idempotent request where the request is a slow request.

In the event the serving computer system fails to complete a request before the protocol dictates that the requesting computer system assume the request message was lost, the requesting computer system retransmits the request message and the serving computer system responds with a slow request message. The present invention employs the same slow response protocol for both idempotent and nonidempotent requests. The protocol for idempotent and non-idempotent are discussed separately for clarity of explanation. FIG. 5 is a chart of the messages required to make a non-idempotent request where the request is a slow request. A non-idempotent request is made when a requesting computer system 10 sends a request message 130 to a serving computer system 20 in the cluster. When the serving computer system 20 fails to respond to the request within the prescribed period of time, the requesting computer system 10 retransmits the request as request message 131. The serving computer system 20, identifying the request as a retransmitted request, then marks the request as a slow request and sends a slow request message 132. The slow response message 132 causes the requesting computer system to stop sending request messages for this request. Then, after the serving computer system completes the necessary processing, the serving computer system sends a response message 133. The serving computer system saves a copy of the response message 133. The requesting computer system 10 then acknowledges the receipt of the response message 133 marked as a slow request by sending an acknowledge message 134. After the acknowledge message 134 is received, the serving computer system 20 discards its copy of the response message 133.

Since there is no guarantee that any message transmitted over the network will reach the intended computer system, the method of the present invention must tolerate lost messages. In the event the original request message is lost over the network, the requesting computer system, for both the idempotent and non-idempotent requests, will wait the prescribed period of time defined by the underlying network protocol and retransmit the request message and again wait for a response. In the event a repeated request message is lost over the network, the process is repeated.

In the event a slow request message is lost over the network, the requesting computer system will retransmit its request message, and the serving computer system will retransmit the slow request message. This is true for both idempotent and non-idempotent requests. This continues until either the slow request message is received or the response is sent.

In the event a response message is lost over the network, the network protocol is determined by whether the slow request message has been sent by the requesting computer system. If the slow request message has not been received by the requesting computer system, then the requesting computer system will, after the prescribed period of time, retransmit its request. The serving computer system will repeat a idempotent request and transmit the appropriate response message to the requesting computer system. For non-idempotent requests, the serving computer system will merely retransmit the saved response message to the requesting computer system. However, if the slow request message has been received by the requesting computer system, then the requesting computer system will never retransmit the request. The preferred embodiment of the present invention then dictates that the serving computer system retransmit the response message if the serving computer system has not received an acknowledge message from the requesting computer system within a prescribed period of time defined by the protocol. This is true for both idempotent and non-idempotent requests.

In the event an acknowledge message is lost for either a non-slow non-idempotent request or a slow request, the serving computer system will retransmit the response message after the prescribed period of time defined by the the protocol and the requesting computer system will, after identifying the response message as a duplicate, retransmit the acknowledge message.

Therefore, using the method of the present invention, network operations will be reliable for both slow and non-slow requests, whether idempotent or non-idempotent. This method of the present invention does not need to address what happens when the serving computer system leaves the cluster before completing a request since the requesting computer sytem is constantly monitoring the network for state of health messages and would use the absence of state of health messages from the serving computer system to determine that the serving computer system has left the cluster.

Figure 6:
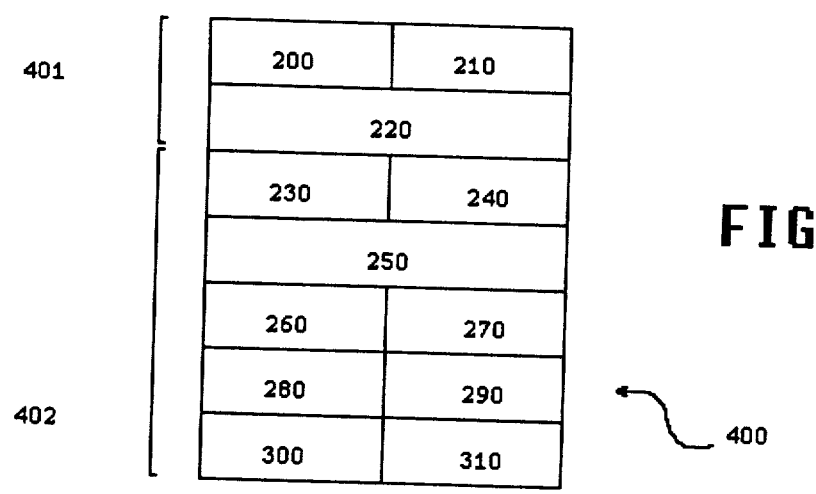
FIG. 6 is a block diagram of the message header for the perferred embodiment of the present invention.

The preferred embodiment of the present invention was implemented for an ETHERNET network. FIG. 6 is a block diagram of the message header 400 for the perferred embodiment of the present invention for use with the ETHERNET network. The message header 400 is divided into two parts, an ETHERNET header 401, as defined by the ETHERNET standard, and the application specific header 402. The ETHERNET header 401 contains a destination address 200, a source address 210 and a message type field 220 and is defined by the ETHERNET protocol. The application specific header 402 comprises a length field 230, flag field 240, a request id 250, a message starting position 260, the length of the application specific header 270, the data length 280, the data start position 290, and array indexes 300 and 310. The array indexes are used by the network drivers of the computer system and the use of the other fields is self evident. Of particular interest are the request id 250 and the flag field 240. The request id field is a monotonically increasing number which is used to identify a request. The requesting and serving computer systems may use this field to determine if a received message is new or a repeat.

Figure 7:
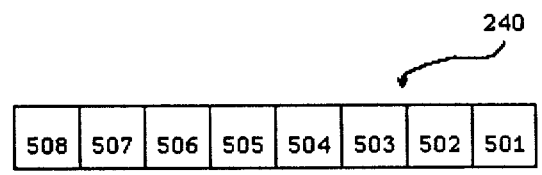
FIG. 7 is a block diagram of the flag field of the message header.

FIG. 7 is a block diagram of the flag field 240 of the message header 400 for the referred embodiment of the present invention. The flag field is used by the requesting and serving computer systems to identify the properties of a received message. The flag field 240 contains 8 flags, of which 6 are used to implement the method of the present invention. Flag 501 indicates that the message is a request message. Flag 502 indicates that the message is a response message. Flag 503 indicates that the message is an acknowledge message. Flag 507 indicates that the message is a slow request message. These flags identify the type of message. Flag 505 indicates that this is the end of the message. This is important when a request or response needs to be broken into two or more message to be transferred over the network as defined by the ETHERNET network protocol. Flag 506 indicates that the message is idempotent.

In an alternative embodiment, the slow response message may be sent after a predetermined period of time, rather than waiting for a repeated request. Additional applications of the present invention are readily apparent to those skilled in the art.

We claim:

1. A method for transferring idempotent or non-idempotent requests over a network having a first computer system and a second computer system which are active, said network being an asynchronous link for messages between said first computer system and said second computer system and wherein said messages are subject to loss on said network, in order to reduce the number of request messages sent over the network, the method comprising:

sending a request in the form of a request message from the first computer system to the second computer system and thereafter retransmitting the request as a duplicate request message after a first prescribed period of time until a response message or a slow request message is received by the first computer system from the second computer system;

receiving the request message from the first computer system by the second computer system;

processing the request in the second computer system, unless the request is a duplicate non-idempotent request;

sending a low request message from the second computer system to the first computer system for each duplicate request message received from the first computer system during the step of processing the request;

receiving the slow request message from the second computer system by the first computer system and in response suspending the step of retransmitting a duplicate request message by the first computer system;

sending a response message from the second computer system to the first computer system containing the results of the request and, only if the slow request message has been sent by the second computer system or if the request from the first computer system was non-idempotent, retransmitting the response message after a second prescribed period of time; until an acknowledge message is received;

receiving the response message by the first computer system and upon receipt of the response message, terminating the sending of request messages; and thereafter sending an acknowledge message from the first computer system to the second computer system to acknowledge the receipt of the response message only in the event the slow request message was sent or the request was non-idempotent.

2. A method as in claim 1, wherein the first and second prescribed times are increased following the transmission of a message which was not received.

* * * * *